United States Patent
Fairhurst et al.

(10) Patent No.: US 7,176,794 B2
(45) Date of Patent: Feb. 13, 2007

(54) METHOD AND APPARATUS FOR CAPTURING AUDIO INPUT USING A TELEVISION

(75) Inventors: Jon A. Fairhurst, Camas, WA (US); Henry Y. Fang, Cerritos, CA (US); Bryan S. Hallberg, Vancouver, WA (US); Mark G. Hanley, Skamania, WA (US); Vishnu Kumar Shivaj Rao, Vancouver, WA (US); Jeffrey B. Sampsell, San Francisco, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 286 days.

(21) Appl. No.: 10/753,915

(22) Filed: Jan. 6, 2004

(65) Prior Publication Data

US 2005/0146642 A1   Jul. 7, 2005

(51) Int. Cl.
- G08B 3/00 (2006.01)
- G08B 5/00 (2006.01)
- G08B 7/00 (2006.01)
- G08B 13/00 (2006.01)
- H04N 7/00 (2006.01)
- H04N 11/00 (2006.01)
- H04N 7/14 (2006.01)
- H04N 5/44 (2006.01)

(52) U.S. Cl. ............... 340/566; 340/691.6; 340/692; 348/552; 348/553; 348/14.01; 348/14.02; 348/14.03

(58) Field of Classification Search ............. 340/691.1, 340/692, 566, 691.6; 348/552–553, 563, 348/14.01, 14.02, 14.03
See application file for complete search history.

(56) References Cited

U.S. PATENT DOCUMENTS 5,936,679 A * 8/1999 Kasahara et al. ........... 348/553
6,021,185 A * 2/2000 Staron ..................... 379/93.17
6,141,058 A * 10/2000 Lagoni et al. .............. 348/563

* cited by examiner

Primary Examiner—Daniel Wu
Assistant Examiner—Lam Pham
(74) Attorney, Agent, or Firm—Marger Johnson & McCollom, P.C.

(57) ABSTRACT

Some embodiments of the invention include a television system having an internal microphone for implementing a voice-messaging system. Using the microphone, the television system detects a message spoken by a user of the television system, and records the message to a memory. Some embodiments of the invention may also record metadata about the message. Embodiments of the invention alert an intended recipient of the message using the audio output or video output of the television system, and subsequently reproduce the message using the audio output of the television system. Other embodiments of the invention are described in the specification and the claims.

23 Claims, 3 Drawing Sheets

METHOD AND APPARATUS FOR CAPTURING AUDIO INPUT USING A TELEVISION

BACKGROUND OF THE INVENTION

1. Technical Field of the Invention

This disclosure relates in general to television systems, and more particularly to a method and apparatus that allows a television system to capture audio information and implement a variety of useful features with the captured audio data.

2. Description of the Related Art

The ubiquitous television set or TV has been around for decades and is familiar to most everyone. In addition to its traditional use as a device for listening to and viewing television or cable television broadcasts, television users are demanding increased functionality from their televisions. Televisions,

DETAILED DESCRIPTION OF THE INVENTION

Several preferred embodiments of the invention will now be described with reference to the several views of the drawings. The embodiments described below are not intended to be a complete or exhaustive list of all embodiments of the invention, rather they are used to help explain and elucidate the inventive concepts embraced by embodiments of the invention. It will be recognized that various modifications may be made to the exemplary embodiments described herein yet the modifications will still retain the inventive concepts. The appended claims are intended to embrace all embodiments of the invention.

Figure 1:
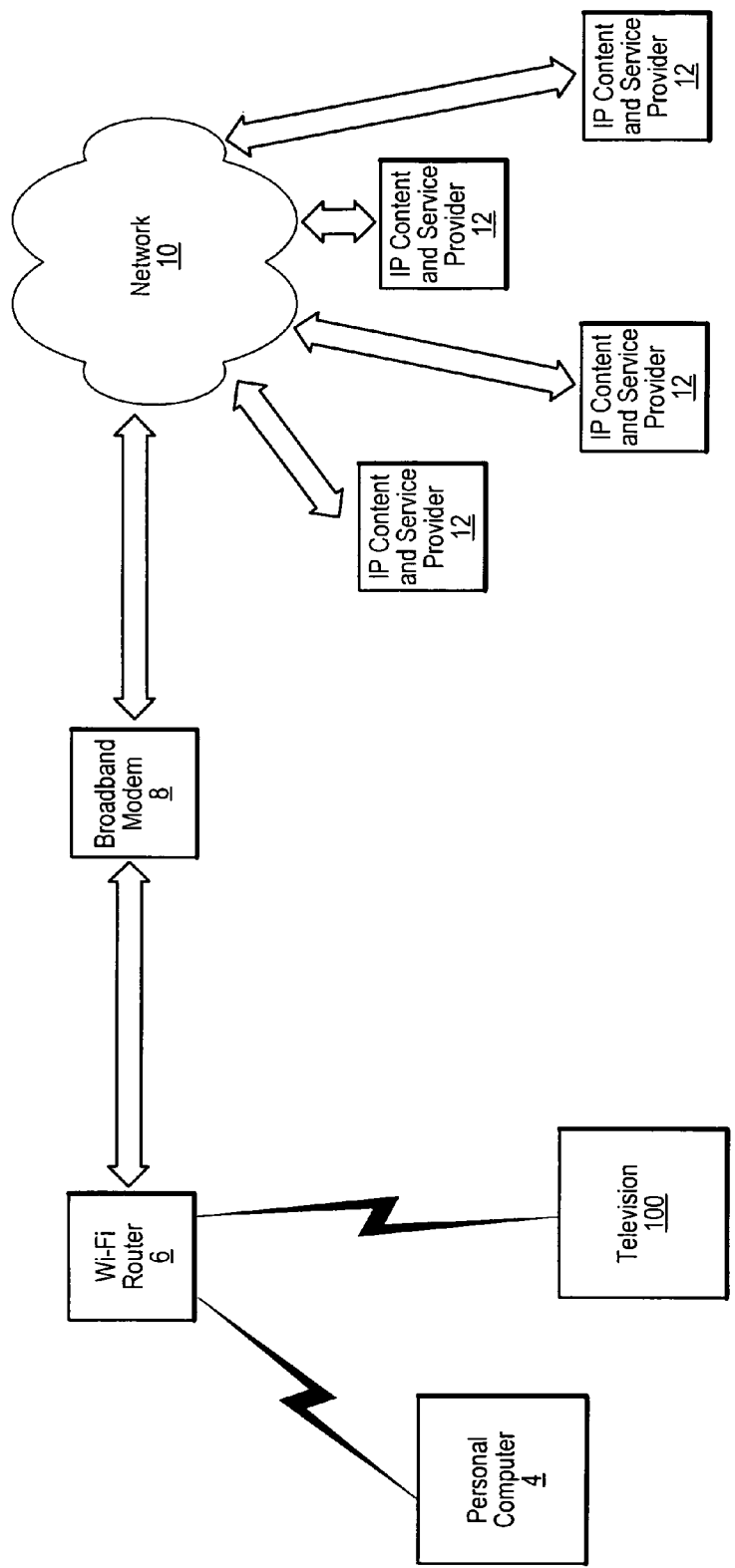
FIG. 1 is a block diagram illustrating a possible operating environment for some embodiments of the invention.

FIG. 1 is a block diagram illustrating an example operating environment for some embodiments of the invention. Television system 100 and personal computer 4 may be wirelessly connected to a Wi-Fi (wireless fidelity) router 6. Wi-Fi is used generically to refer to any type of IEEE 802.11 network. For example, a Wi-Fi network may include those defined by the basic IEEE 802.11 specification or extensions to the basic specification such as IEEE 802.11a, IEEE 802.11b, or IEEE 802.11g.

The wi-fi router 6 is connected, in turn, to a broadband modem 8, which may be, e.g., a cable modem. Broadband modem 8 provides a connection to a network 10. Network 10 may be, for example, the internet or world wide web. The network 10 may be connected, in turn, to a number of IP Content and Service Providers 12.

In the operating environment illustrated in FIG. 1, in addition to outputting television broadcasts, the television system 100 may be able to output content received from the personal computer 4 or from the IP Content and Service Providers 12. For example, popular applications for personal computers include gaming, editing digital images, editing and/or listening to digital audio files such as MP3s (Moving Picture experts group, audio layer 3) or WMAs (Windows Media Audio), and editing and/or playing digital video. In the operating environment illustrated in FIG. 1, the personal computer 4 may provide this content to the television system 100 for playback. In other words, digital images may be transmitted from the personal computer 4 to the television system 100 for display on the monitor of the television system. Likewise, digital audio and/or digital video may be streamed from the personal computer 4 for playback on the audio subsystem and/or display subsystem of television system 100.

The television system 100 may also output content provided from the numerous IP content and service providers 12 by virtue of its connection to the network 8. For example, the user of the personal computer 4 would normally listen to and/or view content from the IP content and service provider 12 with the monitor (not shown) or the speakers (not shown) that are part of the personal computer 4. However, in this operating environment the user may also listen to and/or view the same audio and/or video content received over the network 8 using the monitor (not shown) and speakers (not shown) of the television system 100.

Figure 2:
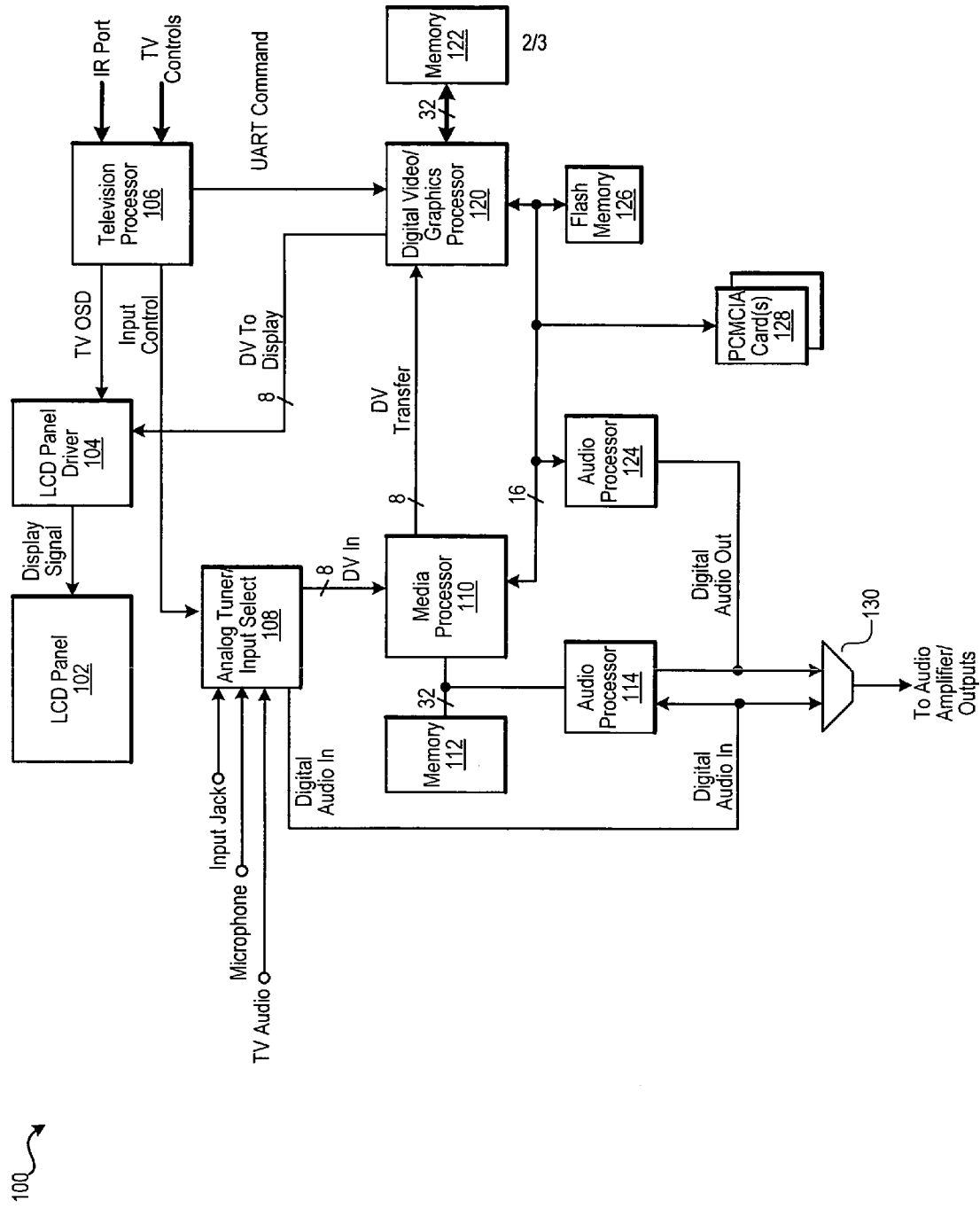
FIG. 2 is a block diagram illustrating an example television system capable of operating according to some embodiments of the invention.

FIG. 2 is a block diagram illustrating an example television system 100 capable of operating according to some embodiments of the invention. In this example, television system 100 is a Liquid Crystal Display (LCD) television. The television system 100 contains an LCD panel 102 that displays visual output to a viewer based on a display signal generated by an LCD panel driver 104. LCD panel driver 104 may accept a primary digital video signal in CCIR656 format (eight bits per pixel $YC_bC_r$, in a "4:2:2" data ratio wherein two $C_b$ and two $C_r$ pixels are supplied for every four luminance pixels) from a digital video/graphics processor 120.

A television processor 106 provides basic control functions and viewer input interfaces for television system 100. Television processor 106 receives viewer commands, both from buttons located on the television itself (TV controls) and from a handheld remote control unit (not shown) through the IR Port. Based on the viewer commands, television processor 106 controls an analog tuner/input selector 108, and also supplies user inputs to a digital video/graphics processor 120 over a Universal Asynchronous Receiver/Transmitter (UART) command channel. Television processor 106 is also capable of generating basic On-Screen Display (OSD) graphics, e.g., indicating which input is selected, the current audio volume setting, etc. Television processor 106 supplies these OSD graphics as a TV OSD signal to LCD panel driver 104 for overlay on the display signal.

Analog tuner/input selector 108 allows television system 100 to switch between various analog (or possibly digital) inputs for both video and audio. Although not shown in FIG. 2, the video inputs may include a radio frequency (RF) signal carrying broadcast television, digital television, and/or high-definition television signals, National Television System Committee (NTSC) video, Super-Video (S-Video) or Luminance/Chrominance Video (L/C Video), and/or red, green, blue (RGB) component video inputs, although various embodiments may not accept each of these signal types or may accept signals in other formats (such as phase alternating line, or PAL, the dominant television standard in Europe). The selected video input is converted to a digital data stream, DV In, in CCIR656 format and supplied to a media processor 110.

Analog tuner/input selector 108 also selects an audio source, digitizes that source (if necessary) using an internal A/D converter (not shown), and supplies that digitized source as Digital Audio In to an Audio Processor 114 and a multiplexer 130. Digitization of the source may not be necessary if it is already supplied to the analog tuner/input selector 108 in digital form.

The audio source may be selected—independent of the current video source—as the audio channel(s) of a currently tuned RF television signal, stereophonic or monophonic audio connected to television system 100 by audio jacks corresponding to a video input, or an internal microphone. These audio sources are represented in FIG. 2 by TV audio, input jack, and microphone, respectively. Since the microphone typically has a relatively low signal amplitude, the output of the microphone is usually passed through an amplifier stage (not shown) before being sent to the source selection switch (not shown) in the analog tuner/input select section 108.

Media processor 110 and digital video/graphics processor 120 provide various digital feature capabilities for television system 100. In some embodiments, processors 110 and 120 can be TMS320DM270 signal processors, available from Texas Instruments, Inc., Dallas, Tex. Digital video/graphics processor 120 functions as a master processor, and media processor 110 functions as a slave processor. Media processor 110 supplies digital video, either corresponding to DV In or to a decoded media stream from another source, to digital video/graphics processor 120 over a DV transfer bus.

Media processor 110 may perform MPEG (Moving Picture Expert Group) coding and decoding of digital media streams for television system 100, as instructed by digital video/graphics processor 120. A 32-bit-wide data bus connects memory 112, e.g., two 16-bit-wide×1M synchronous Dynamic Random Access Memory (DRAM) devices connected in parallel, to processor 110. The audio processor 114 is also connected to this data bus to provide audio coding and decoding for media streams handled by media processor 110.

Digital video/graphics processor 120 coordinates (and/or implements) many of the digital features of television system 100. A 32-bit-wide data bus connects memory 122, e.g., two 16-bit-wide×1M synchronous DRAM devices connected in parallel, to processor 120. Although the embodiments of the invention shown in FIG. 2 utilize DRAM memory devices, other embodiments of the invention may be implemented with other memory types, for example, synchronous dynamic random access memory (SDRAM) devices. Furthermore, memory 112 and memory 122 need not be volatile memory. For example, alternative embodiments of the invention may be implemented using static random access memory (SRAM). Other embodiments of the invention may not even utilize silicon-based memory. For example, alternative embodiments of the invention may be implemented with disk-based technology or any other storage technology.

A 16-bit-wide system bus connects processor 120 to media processor 110, an audio processor 124, flash memory 126, and removable PCMCIA (Personal Computer Memory Card International Association) cards 128. Flash memory 126 stores boot code, configuration data, executable code, and Java code for graphics applications, etc. PCMCIA cards 128 can provide extended media and/or application capability. Digital video/graphics processor 120 can pass data from the DV Transfer bus to LCD panel driver 104 as is, but processor 120 can also supercede, modify, or superimpose the DV Transfer signal with other content.

Multiplexer 130 provides audio output to the television amplifier and line outputs (not shown) from one of three sources. The first source is the current Digital Audio In stream from analog tuner/input selector 108. The second and third sources are the Digital Audio Outputs of audio processors 114 and 124. These outputs of audio processors 114 and 124 are tied to the same input of multiplexer 130, since each audio processor is capable of tri-stating its output when it is not selected. In some embodiments, processors 114 and 124 can be TMS320VC5416 signal processors, available from Texas Instruments, Inc., Dallas, Tex.

According to some embodiments of the invention, the television system 100 of FIG. 2 may be used to implement a voice recorder as a memo system or an in-house messaging system. These particular embodiments will be described below with reference to FIG. 2.

As was previously explained, the user of the television system 100 may select a desired audio source using TV Controls that are input into the television processor 106. The television processor 106 then commands the analog tuner/input selector 108 to select the desired audio source with the Input Control signal.

The selected audio source is digitized, if necessary, and presented to a microprocessor-based sub-system in television system 100. In FIG. 2, this sub-system includes the audio processor 114. Once the audio source has been digitized and sent to the audio processor 114, the digitized audio source data is stored in memory 112. According to some embodiments of the invention, the digitized audio source data may be compressed or otherwise reduced in bits per second of audio by the audio processor 114 before being stored in memory 112.

According to some embodiments of the invention, the audio clips that are stored in memory 112 have metadata associated with the audio clip. Metadata can be thought of as "data about data." Metadata may describe how, when, by whom, and for what purpose a particular set of data was collected, and how the data is formatted.

According to some embodiments of the invention, the metadata associated with the stored audio clips may include a timestamp, length information, information about the intended recipients of the audio clip, who recorded the audio clip, and title information. There may be other metadata associated with the stored audio clip as well. The metadata about the stored audio clip may be accessed quickly, without requiring that the associated audio clip be decoded or played back.

As was explained above, the television system 100 may include flash memory 126 and PCMCIA cards 128. Flash memory 126, PCMCIA cards 128, memory 112, and memory 122 may run a variety of applications, and these applications have access to the stored audio clips. Depending on the particular application, the application may play the audio clip, further process the audio clip, duplicate and store the audio clip to another media, and/or transmit the audio clip across the network 10 (FIG. 1) or to the personal computer 4 (FIG. 1).

In a voice recorder or an in-home messaging system according to some embodiments of the invention, an application may notify viewers of the television system 100 that an audio clip is available. For example, a first television user could use the TV controls to record a voice message using the Microphone input attached to the analog tuner/input selector 108. As a result of this selection process, the audio processor records the first television user's spoken voice. The recorded messaged may be, for example, "Please remember to take the trash to the curb today."

Using the TV Controls, the first user may assign the recorded audio clip to be delivered to one or more other television users. The intended recipients of the recorded audio clip are metadata associated with the recorded audio clip.

According to some embodiments of the invention, a voice-messaging application will activate a notification or alert so that the intended recipients of the recorded audio clip are aware of the existence of the recorded audio clip. For example, a dedicated visible light could be incorporated on the television, and the light could be activated in a manner designed to generally alert all users of the television system 100 that there are recorded messages. Similarly, the voice messaging application may cause the digital video/graphics processor 120 to overlay, using the DV To Display signal, an icon, symbol, or even the recipient's name on the output of the LCD panel 102.

The voice messaging application may also use audible alerts to augment or replace the visible notifications described above. For example, the voice messaging application may cause the audio processor 114 or 124 to send beeps, chirps, buzzes, musical notes, or even spoken voices to the audio outputs of the television system 100. The audible alerts may themselves be other recorded audio clips (such as recorded voices) or they may be digital audio files that contain the desired notification alert.

Undoubtedly there is a vast number of specific ways to notify the intended recipients of a recorded audio clip that they have a message waiting for them and an even larger number of ways to tailor the notification to individual recipients. However, all the ways in which this could be accomplished are simply too numerous to be completely categorized here. Embodiments of the invention are intended to encompass all such methods.

In a voice messaging application according to some embodiments of the invention, once a television user has seen and/or heard a general notification alert, the user may choose the check the recorded message at that time to discover if the message is for them. Obviously, if the notification alert was tailored for the individual recipient, this would not be necessary and the television user would know already that they had a message. Similarly, the voice application may provide the ability for a television user to check for any messages immediately, without waiting for a notification alert.

In a voice messaging application according to some embodiments of the invention, the television system 100 may prevent certain audio and video input sources from being selected until after the recorded audio clip is retrieved and played back. For example, using the scenario outlined above, the voice application may prevent the television system 100 from being used at all until the recorded audio clip "Please remember to take the trash to the curb today" is played back.

According to other embodiments of the invention, intended recipients of recorded audio clips would have the option of playing back the recorded audio immediately or waiting until a later time. The recipient may also check the metadata associated with each recorded audio clip. For example, the recipient may check duration, timestamp, and the sender's name. The recipient may also perform management functions such as storing the recorded clip to another media, sending the recorded clip to a networked destination (such as the personal computer 4 of FIG. 1), or deletion of the recorded audio clip.

According to some embodiments of the invention, management functions for the recorded audio clips may be automated. For example, the application would be able to automatically detect and delete recorded audio clips that exceed a given pre-defined or user-defined age.

Figure 3:
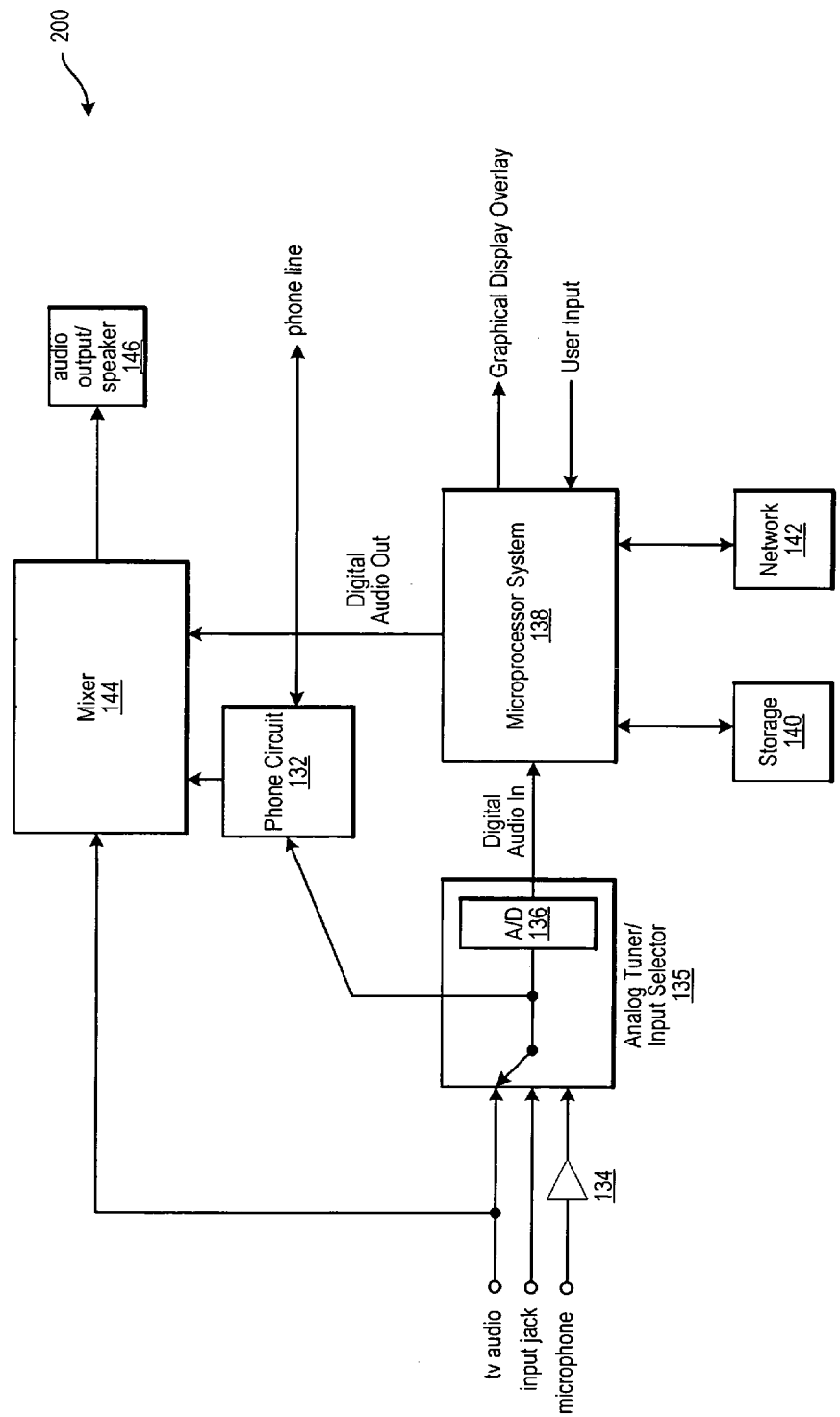
FIG. 3 is a block diagram illustrating another example television system capable of operating according to some embodiments of the invention.

FIG. 3 is a block diagram illustrating some components of another example television system 200 capable of operating according to some embodiments of the invention. FIG. 3 does not show all the components necessary for a television system. For example, a monitor of some sort is not illustrated. Some components are not illustrated in order not to add unnecessary clutter to FIG. 3 and otherwise obscure the embodiments illustrated by FIG. 3.

Like television system 100 of FIG. 2, television system 200 includes an analog tuner/input selector 135. The input selector 135 shows the source select switch and the A/D converter 136 which is used to digitize the selected analog source and generate the Digital Audio In signal. The analog sources include TV Audio, Input Jack for an external audio source, and an internal microphone. The microphone output typically has a low signal amplitude so it is amplified by amplifier 134 before being input to the analog tuner/input selector 135. The types and numbers of analog inputs shown in FIG. 3 are examples only, other embodiments of the invention may have multiple input jacks or even inputs from digital sources, for example.

The television system 200 also includes a microprocessor system 138. The microprocessor system may accept user inputs from a television remote control (not shown) or from a control panel (not shown) placed in a convenient location on the housing of the television system 200. Like the television system 100 of FIG. 2, the microprocessor system 138 provides the television system 200 the ability to execute applications. The code for these applications may be stored in the storage 140. Storage 140 may be non-volatile or volatile memory, silicon-based, disk-based, or any other storage technology. The microprocessor system 138 may also execute applications stored in a network device (not shown) that is connected to network 142.

Like the television system 100 of FIG. 2, the television system 200 of FIG. 2 has the ability to record audio inputs and store the recorded audio clips in storage 140, where they are made available to applications running on the microprocessor system 138 or to other network devices (such a personal computer, not shown) connected to the microprocessor system 138 through the network 142.

Like the television system 100 of FIG. 2, the television system 200 of FIG. 3 can implement a voice messaging application according to some embodiments of the invention. Notification alerts may be issued either audibly through the audio output/speaker 146 and/or visibly through a Graphical Display Overlay signal that is generated by the microprocessor system 138 and sent to the television monitor (not shown). Since details of the voice messaging application according to embodiments of the invention were discussed above with respect to FIG. 2, a duplicative description will not repeated with respect to FIG. 3.

Unlike the television system 100 illustrated in FIG. 2, television system 200 also includes a phone circuit 132. The phone circuit 132 may take the form of any number of specific types of phone depending on the technology used. For example, the phone circuit 132 may be a plain old telephone service (POTS) phone, an integrated services digital network (ISDN) phone, a broadband-ISDN (B-ISDN) phone that uses fiber-optic cables, or a fiber distributed data interface (FDDI) phone, which also uses fiber-optic cables.

The television system 200 also includes a mixer 144 that receives as input the analog TV audio signal, the Digital Audio Out signal from the microprocessor system 138, and the audio output from the phone circuit 132. The mixer 144 may select between any of these inputs depending on the User Input to the microprocessor system 138.

The addition of the phone circuit 132 gives the television system 200 the ability to stream the audio for a telephone or voice-over-IP application. In either case a visual application is included with the help of the Graphical Display Overlay from the microprocessor system 138 that allows the user of the television system 200 to connect to a destination by a calling a phone number.

The calling process may be accomplished by User Input through the TV remote control (not shown), by User Input through the control panel (not shown) located on the television system 200, by the microprocessor system 138 processing recorded audio clips of the user speaking the desired phone number, or by other means.

With the phone circuit 132, other phone features could be implemented as well. These features may include a disconnect feature, a muting feature, or a voice messaging feature, where voice messages recorded by the users of the television are played through the audio output/speaker 146 while the microphone input is selected by the analog tuner 135 and the phone line connection is established by the phone circuit 132. This feature would allow recorded audio clips to reach intended recipients through their phone lines, even if the intended recipient is not within the vicinity of the television system 200. The phone lines may include land lines or wireless links.

As shown in FIG. 3, the analog output of the amplifier 134 is connected directly to the phone circuit 132 when the microphone input is selected by the analog tuner 135. This configuration may be utilized when the phone circuit is a standard POTS phone. If a voice-over-IP application is supported, then only the digital connection (Digital Audio Out) may be used.

Having described and illustrated the principles of the invention in several exemplary embodiments thereof, it should be apparent that the invention can be modified in arrangement and detail without departing from such principles. We claim all modifications and variation coming within the spirit and scope of the following claims.

We claim:

1. A television system, comprising:
    an internal microphone configured to convert a sound originating from outside the television system into an electrical signal;
    an input selector configured to select from among a plurality of inputs, the plurality of inputs including a television audio signal and the electrical signal;
    a processor coupled to the input selector and configured to convert the electrical signal into an Internet Protocol (IP) formatted digital audio file;
    a memory coupled to the processor and configured to store the digital audio file; and
    a wireless fidelity (Wi-Fi) interface configured to send the IP formatted digital audio file though a Wi-Fi router to an Internet network.

2. The television system of claim 1, wherein the Wi-Fi interface used for sending the digital audio files to the Wi-Fi router comprises a removable Personal Computer Memory Card International Association (PCMCIA) card.

3. The television system of claim 1, wherein the processor generates a metadata file for the audio file that identifies an intended remote recipient of the audio file, the metadata file and the associated digital audio file then sent to the remote recipient over the IP network.

4. The television system of claim 1, further comprising:
    a phone circuit coupled to the input selector.

5. The apparatus television system of claim 4, wherein the phone circuit is chosen from the group consisting of an integrated services digital network (ISDN) phone, a broadband-ISDN (B-ISDN) phone, and a fiber distributed data interface (FDDI) phone.

6. The television system of claim 3 wherein the wireless interface wirelessly connects the audio file and an associated metafile through the Wi-Fi router to a personal computer using an IEEE 802.11 protocol.

7. The television system of claim 3 wherein the processor prevents the television system from being used until the digital audio file is played back by a recipient identified by the metafile.

8. A television system comprising:
    a microprocessor;
    a television screen coupled to the microprocessor;
    a television speaker coupled to the microprocessor;
    a television microphone coupled to the microprocessor;
    a memory coupled to the microprocessor;
    an input selector coupled to the microprocessor;
    a phone circuit coupled to the input selector for receiving audio signals from a remote location and sending the audio signals to the microprocessor for formatting as audio files for visually identifying on the television screen and outputting from the television speaker, the phone circuit further sending audio files formatted by the microprocessor from audio signals received from the television microphone over the phone circuit to the remote location; and
    an Internet Protocol (IP) network interface operating separately and independently from the phone circuit for sending audio files formatted by the microprocessor from audio signals received from the television microphone to another television system or a personal computer using an Internet Protocol (IP) and further receiving audio files over the IP network interface from the other television or personal computer and then identifying the audio files on the television screen and playing out the audio files from the television speaker.

9. The television system of claim 8 IP network Interface receives other audio files over an IP network from a remote IP content and service provider and then identifies the audio files on the television screen and when selected plays the audio files from the television speakers.

10. The television system of claim 9, wherein the input selector comprises:
    a source selection switch configured to select from a plurality of inputs, the plurality of inputs including a television microphone output and a television audio signal; and
    an A/D converter configured to digitize a selected one of the plurality of inputs.

11. The television system of claim 10, wherein the microprocessor is configured to record the television microphone output and transmit the television microphone output over the IP network interface to a network device for storage.

12. The television system of claim 11, wherein the network device comprises a personal computer.

13. The television system of claim 10, wherein the microprocessor is configured to record the television microphone output and store it in the memory.

14. The television system of claim 8 wherein the processor generates metafiles for associated audio files that identify a remote destination for sending the audio files and then sends the audio files to the identified remote destination over the IP interface.

15. The television system of claim 8, wherein the IP network interface is a removable Personal Computer Memory Card International Association (PCMCIA) card removably attached to the processor through a system bus.

16. The television system of claim 10, wherein the input selector includes:
   a first input connected to an analog television audio signal;
   a second input coupled to an analog television microphone output;
   a first analog audio output selectively coupling the first or second input to the phone circuit and to an analog to digital converter; and
   a second digital audio output selectively coupling an output of the analog to digital converter to the processor.

17. The television system according to claim 16 including an audio mixer coupled to:
   the first input selector input for receiving the analog television audio signal;
   the phone circuit for receiving analog audio signals from both a phone line or from the first analog audio output from the input selector; and
   the processor for receiving digital audio files from the IP network.

18. A method for voice messaging using a television system, the method comprising:
   detecting a sound with a microphone that is internal to the television system;
   storing the sound in a memory;
   converting the sound into an Internet Protocol (IP) formatted audio file for transporting over an IP network;
   sending the IP formatted audio file through a wireless fidelity (Wi-Fi) connection and the IP network over an IP recipient;
   alerting an intended recipient the sound exist using an audio output of recipient television system; and
   reproducing the sound using an audio output of the recipient television system.

19. The method of claim 18, wherein storing the sound in memory comprises:
   storing metadata about the sound in the memory.

20. The method of claim 19, wherein the metadata comprises:
   a timestamp;
   a duration;
   the intended recipient of the sound;
   an originator of the sound; and
   a title.

21. The method of claim 18, wherein alerting the intended recipient comprises:
   alerting the intended recipient using a video output of the television system.

22. The method of claim 21, wherein alerting the intended recipient using the video output comprises:
   overlaying an alert signal on the video output, the alert signal chosen from the group consisting of a symbol and a name of the intended recipient.

23. The method of claim 19 including using a removable Personal Computer Memory Card International Association (PCMCIA) card for sending the IP formatted audio file through the wireless fidelity (Wi-Fi) connection and the IP network to the remote recipient.

* * * * *